(12) United States Patent
Chen Kaidi

(10) Patent No.: US 11,509,691 B2
(45) Date of Patent: Nov. 22, 2022

(54) PROTECTING FROM DIRECTORY ENUMERATION USING HONEYPOT PAGES WITHIN A NETWORK DIRECTORY

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 230 days.

(21) Appl. No.: 16/875,806

(22) Filed: May 15, 2020

(65) Prior Publication Data

US 2021/0360028 A1 Nov. 18, 2021

(51) Int. Cl.
*H04L 9/40* (2022.01)

(52) U.S. Cl.
CPC ...... *H04L 63/1491* (2013.01); *H04L 63/1441* (2013.01)

(58) Field of Classification Search
CPC .... H04L 63/1491; H04L 9/40; H04L 63/1441
See application file for complete search history.

(56) References Cited

U.S. PATENT DOCUMENTS

| 10,868,830 B2 * | 12/2020 | Kakumaru | H04L 63/1425 |
| 2009/0328216 A1 * | 12/2009 | Rafalovich | H04L 63/1441 726/23 |
| 2011/0214182 A1 * | 9/2011 | Adams | G06F 21/00 726/23 |
| 2020/0089876 A1 * | 3/2020 | Aharoni | G06F 21/566 |
| 2021/0336970 A1 * | 10/2021 | Woo | H04L 9/40 |

FOREIGN PATENT DOCUMENTS

| CN | 102185858 A | * | 9/2011 | |
| CN | 102088379 B | * | 3/2013 | |
| WO | WO-2016189843 A1 | * | 12/2016 | ............. H04L 63/10 |

* cited by examiner

*Primary Examiner* — Jayesh M Jhaveri
(74) *Attorney, Agent, or Firm* — Haynes and Boone, LLP

(57) ABSTRACT

There are provided systems and methods for protecting from directory enumeration using honeypot pages within a network directory. A service provider, such as an electronic transaction processor for digital transactions, may have an internal network that is utilized by employees, developers, and other end users within the organization of the service provider. When internal devices become compromised or internal users act maliciously, they may attempt to enumerate a directory to find hidden pages that have secret or sensitive data. The service provider may therefore detect a scan of an internal directory having files paths to files and pages and may deploy honeypot pages that change an error status. Further, the service provider may add a process or operation to log additional data on these honeypot pages and/or change a byte size of the corresponding pages to confuse the enumeration attempt and obtain true source information.

20 Claims, 5 Drawing Sheets

PROTECTING FROM DIRECTORY ENUMERATION USING HONEYPOT PAGES WITHIN A NETWORK DIRECTORY

TECHNICAL FIELD

The present application generally relates to detecting directory enumeration and deploying honeypot files and/or pages within a directory of file paths and more particularly to deploying honeypot pages to protect against a directory enumeration attempt by a computing device on an internal network using honeypot pages that trap and confuse directory enumeration attempts.

BACKGROUND

Service providers may include internal networks that allow employees, administrators, and other end users within the service provider's organization to utilize internal computing resource of the service provider. This may include allowing the end users to access, view, and utilize internal documents, applications, databases, and other resources, which may include sensitive or confidential material. As hackers and other malicious users or entities become more sophisticated, they may get access to the internal network through malware, viruses, phishing schemes or keyloggers, and other computing attacks that exposes the internal network of the service provider to the malicious party. Further, some businesses, companies, or other organizations may have internal bad actors. With access to an internal network, malicious parties may detect and navigate to certain file paths that include sensitive or confidential data, applications, or other resources. This may be done through directory enumeration, where hidden or generally inaccessible files and pages may be detected through scanning file paths in a directory. Thus, service providers are required to quickly detect and deflect such computing attacks to reduce risk, data exfiltration, fraud, and potential damage or exposure of data.

Figure 1:
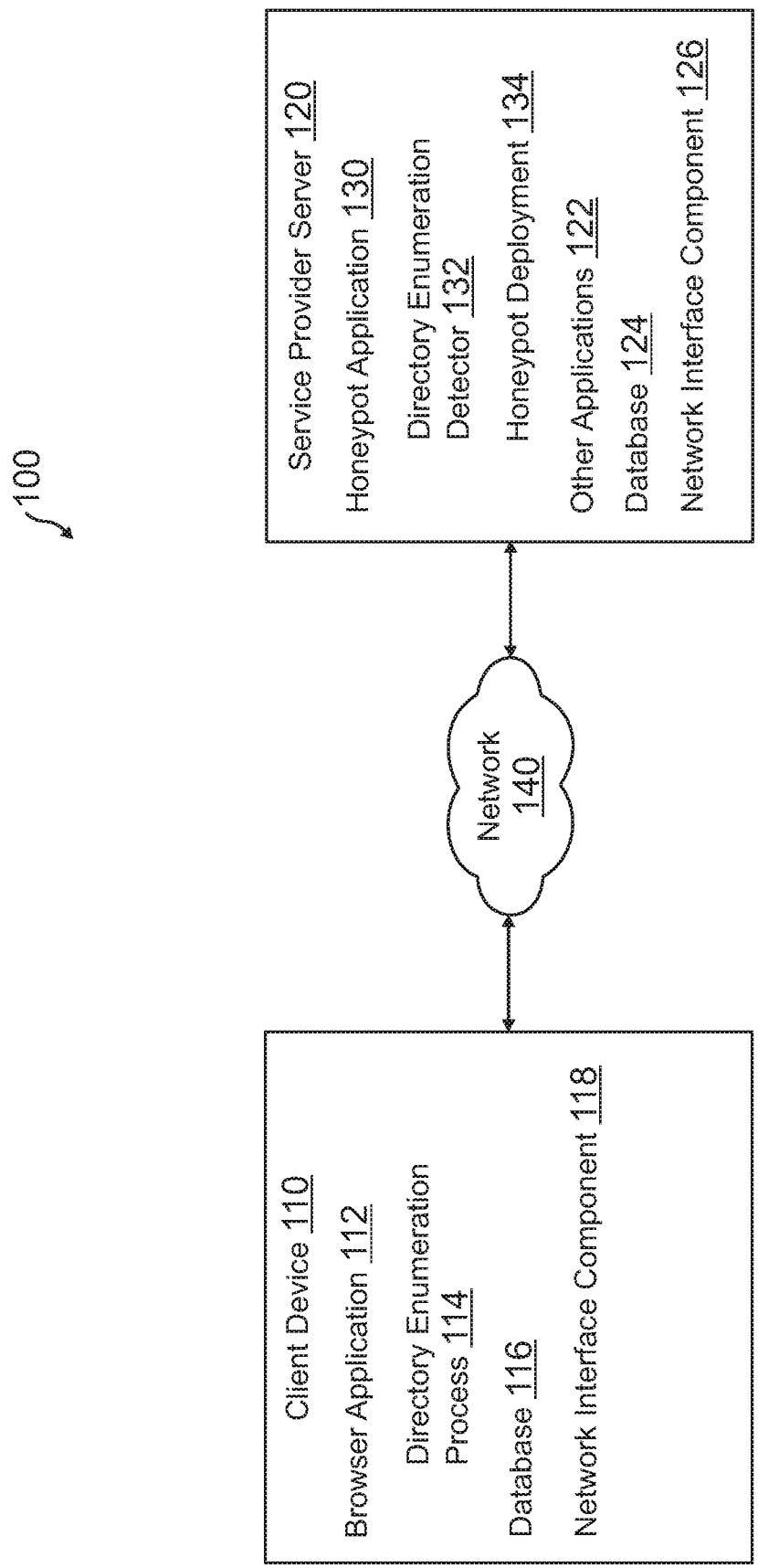
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for protecting from directory enumeration using honeypot pages within a network directory. Systems suitable for practicing methods of the present disclosure are also provided.

In an online service provider's system, or other organization's system, the service provider may have an internal network accessible to different employees and internal end users of the service provider. Generally, these internal systems provide an intranet that is accessible by authorized users and allows those users to transmit content and perform actions that may be private and protected from a larger external network. In this internal network or intranet, the service provider may utilize one or more IP or network addresses, which may be shared by different users of the internal network, which may make tracking of particular devices difficult. Also, other log data to track internal network use by computing devices may be unavailable due to log size optimization rules for the internal network. However, these internal networks may also suffer from similar problems due to malicious actors, malware or other malicious applications, and other bad activities. For example, malware may be installed on a computer when the computer becomes compromised, which may execute a directory enumeration that attempts to detect internal pages that may be hidden, secret, or unavailable. These pages may include private data, including passwords saved during a backup attempt, confidential information, and/or sensitive applications or logins. A malicious actor may also execute a program to perform the directory enumeration, such as an internal bad actor or an external bad actor that gains access to the internal network.

Thus, in order to prevent and/or protect from directory enumeration by internal computing devices, the service provider may deploy honeypot files or pages within the file paths of one or more directories for files and pages of the internal network. This may also include virtual pages where multiple file paths may map to the same file or page. These honeypot pages may be used to attempt to gain additional information when a scan or a subsequent page access request navigates to the file path for the page, such as an IP address logger, a network address logger, a user-agent string logger, a device ID logger, a honeypot login screen (e.g., a username/password logger), or other process and/or at increased log verbosity levels. The pages may also include randomized or altered page status codes and/or page byte sizes so that directory enumeration attempts are confused and provide useless or unhelpful results to the malicious entity, party, device, or software.

For example, a service provider, which may provide services to users including electronic transaction processing such as online transaction processors (e.g., PayPal®), may allow merchants, users, and other entities to process transactions. Other service providers may also provide computing services, including social networking, microblogging, media sharing, messaging, business and consumer platforms, etc. In order to provide the computing services of a service provider, an internal network or intranet may be provided to the end users, developers, administrators, and other employees of the service provider. The internal network includes the resources, databases, applications, and communications of the service provider in a private intranet. Further, different files and pages may be accessed through different file paths of directories of the service provider. A file path specifies and denotes a unique location within a file system, such as a computing system having a directory of different file paths to files or pages. A file path may be used to point to and access a file or page within the file system by using a directory tree hierarchy. This file path may correspond to a string of characters that may be followed using the directory tree hierarchy to access the page. For example, a file path may point to a drive, database, or the like, as well as additional navigations through the directory hierarchy.

Thus, when a directory enumeration is attempted, the malicious device may perform an automated process that attempts to enumerate all valid file and page locations within a directory of file paths. For example, the directory enumeration may go through, or enumerate, a list of file path strings, such as "a 0", "a 1", through to "azzzz", before moving on to "b**", and then "c**". This is done to test if a page returns a 200 OK, 200 Success, or 200 OK Success page status response code, which indicates that the request for the page at the file path has succeeded and there is a valid page at the file path. This would be returned instead of a 404 error message, such as, 404 Not Found, 404 Page Not Found, or 404 Server Not Found message. By enumerating these pages, the attacker or malicious party may detect hidden or secret pages, which may be accessed.

A directory enumeration may be detected when the directory enumeration attempt executed by an operation or application performs a scan of a directory. This may be done by a malicious or compromised computing device, or it may be done by legitimate actors in certain situations (e.g., when a developer is attempting to locate certain pages or documents when updating, cleaning, or otherwise maintaining a directory). During the scan, the servers and systems of the internal network of the service provider may detect a large amount or rate of processing, querying, or navigation hits on a particular directory, domain or file path(s). For example, 1,000 hits on a destination directory may be detected in a span of 30 minutes, which may be abnormal and/or may persist for a number of intervals (e.g., three 30-minute intervals). Thus, the rate-based detection may detect a rate of page hits within a directory over a certain threshold and/or may detect that a page return error status (e.g., a 404 error message) may be over a particular threshold. The directory enumeration may also be detected when certain pages are scanned, such as already deployed honeypot pages or decoy pages that would not be normally accessed, including accessing a certain number or over a threshold number of these pages.

In response to the directory enumeration attempt that is detected by service provider's directory enumeration protection system, the service provider may begin and/or scale up deployment of honeypot files and pages at certain file paths. The service provider may not have previously deployed any honeypots, and in response to the detected directory enumeration attempt, may begin deploying pages. However, in other embodiments, a certain amount of honeypot pages may be pre-deployed, and the service provider may determine whether to scale up deployment or maintain the current honeypot pages to protect from the directory enumeration. Pages may be deployed by provide a certain file and/or accessible page at certain file paths within the directory being enumerated. The service provider may select specific file paths that previously would have returned a 404 error status for having no file or content at the file path. Thus, the service provider may select file paths not previously being used or having existing files. Selection of the file paths may correspond to those file paths that are more likely to be scanned or may be randomized by the service provider. Further, alteration of the status code may occur at a code level by deploying the honeypot pages and files at a code level with the file path, or may be deployed at a proxy level where the previous page status code for the file path is detected, transformed to the honeypot page, and returned to the computing device accessing and/or scanning the file path.

When deploying the honeypot pages at selected file paths, the service provider may deploy a few different files and pages to protect against directory enumeration. In some embodiments, a page may be provided at a selected file path that returns a success or valid path, such as a 200 success message. Thus, when the directory enumeration attempt scans the file path, the page at the file path appears to be valid. The results of the directory enumeration may therefore indicate that the malicious actor should access the honeypot page using the file path. Further, the honeypot page may be deployed with a process or operation that attempts to gain additional information about the true source and/or computing device performing the directory enumeration and/or attempting to access the hidden or secret pages. For example, the honeypot page may include an IP address logger, a device identifier (ID) logger, an authentication page and/or login option to provide a username or user/account ID, application ID or information, or other process that requests additional information from the device and/or user accessing the honeypot page.

Since no legitimate end user should hit these pages, the service provider may determine additional information regarding the malicious user. Using the obtained information about the true source (e.g., user and/or computing device) of the directory enumeration and malicious actions, the service provider may execute one or more processes. For example, the service provider may rate limit the particular computing device, bar the computing device from additional actions, navigations, or scans, or otherwise flag the computing device. The service provider may investigate and scan the identified device to detect any malware, as well as execute a process to remove the malware or quarantine the malware and/or device. The service provider may also penalize the device, user, and/or account or remove the device, user, and/or account from the internal network. The service provider may also take actions with regard to the IP address and a group of devices using the IP address, such as by blocking off and/or flagging the IP address, or rate limiting the IP address.

The service provider may also deploy different honeypot files and pages via different status codes and different returned bytes sizes when the malicious computing device is performing a scan of a directory. In this regard, the service provider may change the error or page not found status code (e.g., 404 error message) to a valid status code (e.g., 200 OK status) or a redirect status code (e.g., a 301 response status code, such as a Redirect or Permanently Moved status code indicating a redirect to another page). Other status codes may also be utilized. These altered or modified status codes may be returned when accessing specific resources within a directory during a scan and/or after a scan (e.g., when a malicious actor navigates to a page or file that has been enumerated through scanning a directory). The service provider may return a randomized or selected byte size. For example, a 404 error message status code may normally return only 3 kilobytes (KB) for an unavailable page. However, the service provider may return a large page byte size, such as 20 KB, 200 KB, 900 KB, in the megabytes (MB), etc. The status code and byte size changes may also be combined to further provide different results. These honeypot pages therefore provide different results that indicate certain file paths may be valid, even when those file paths are not and/or point to honeypot pages. This causes the directory enumeration's results to be confused, useless, or unhelpful to the malicious actor as the actor is no longer aware of what pages are actually legitimate and may be required to go through lengthy and difficult processes to navigate to any valid or secret data.

In various embodiments, the honeypot pages may be deployed first, before any directory enumeration, or at the time of detection of a directory enumeration, as discussed herein. Further, based on the aggressiveness or rate of the directory enumeration (e.g., hits to file paths per minute, hour, etc.), the deployment of the honeypot pages may be scaled up or down. For example, a directory enumeration that is scanning many pages may cause the service provider to quickly deploy many pages, while a less aggressive one may cause less pages to be deployed and more analysis into the scanning to be conducted (e.g., where the scanning may be done legitimately). Moreover, when the directory enumeration has ended or the hits per time period have fallen below a threshold, the honeypot pages may be reduced and/or removed from the file paths of the scanned directory.

In some embodiments, the service provider may further identify the type of directory enumeration and/or attack, as well as the directory that is being scanned, in order to deploy certain types of honeypots in a preferential manner over different honeypots. For example, a directory with low amounts of secret pages may not require many honeypot pages that obfuscate the valid pages using different status codes and byte sizes, as the secret pages are unlikely to be found with the preexisting valid pages. Thus, more honeypot pages that attempt to get information about the true source may be deployed. However, in other embodiments, honeypot pages that attempt to obfuscate the directory enumeration may be used to hide secret pages quickly and cause the least likelihood of breach. For example, in a directory having many secret or unlisted pages that may include sensitive or confidential information (e.g., authentication credentials, passwords, various configuration files, etc.), honeypot pages having modified or randomized status codes, varying custom error messages, and/or modified or randomized byte sizes may be deployed in an increased manner so that the results of a directory enumeration may be confused and rendered unhelpful in attempting to determine the secret pages. However, in a directory with less secret pages, more honeypot pages having logging mechanisms and/or login portals for entry of identification information for a true source of the directory enumeration may be used. This may increase a likelihood that the true source navigates to the honeypot page and provides information that may identify that true source of the directory enumeration. Further, a bad actor is enumerating for configuration files within a directory, such as by using */*.conf or */*.config for instance (where * denotes enumerated paths), the service provider may return more 200 OK or Valid status with spoofed and/or padded file byte sizes. This would therefore return more of the fake honeypot pages that may appear as valid configuration files so that the bad actor attempts to access the honeypot pages instead of valid configuration files.

Furthermore, during deployment of the honeypot pages, locations or file paths of the honeypot pages may be changed to further protect from the directory enumeration by confusing the results and increasing a likelihood of retrieving information on the true source. In some embodiments, deployment of particular honeypot pages may be done at certain file paths and/or locations within a directory to increase a likelihood in confusing the directory enumeration and/or discovering information about the true source of the directory enumeration. For example, a honeypot page having a logging mechanism may be deployed at certain locations or hierarchies with a directory that entices or encourages the true source of the directory enumeration to navigate to those pages (e.g., at file paths having certain strings or names that may appear legitimate or at file paths within a hierarchy of the directory that is commonly or widely used). Similarly, honeypot pages with modified or randomized byte size and status codes may be deployed at locations that cause those pages to be legitimate within a directory to appear more believable and further confuse the results of the directory enumeration. Additionally, such measure may also be utilized with an external network and publicly accessible pages and directories of the service provider. For example, the service provider may wish to deter and/or protect from external directory enumeration of their externally accessible pages. Thus, a similar system may be deployed utilizing the directories of external pages to prevent from directory enumeration of webpages of a website or other external directory.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110 and a service provider server 120 in communication over a network 140. Client device 110 may be utilized by a user over an internal network or intranet, such as network 140, where service provider server 120 may provide various data, operations, and other functions to client device 110 via network 140. In this regard, client device 110 may execute an operation to perform a directory enumeration attempt of a directory within network 140. Service provider server 120 may detect the enumeration attempt and may further deploy honeypot pages to obfuscate, confuse, or provide unhelpful results, as well as attempt to gain additional information of the true source of the enumeration attempt.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a browser application 112, a database 116, and a network interface component 118. Browser application 112 may correspond to executable processes, procedures, and/or applications with associated hardware. In other embodiments, client device 110 may include additional or different modules having specialized hardware and/or software as required.

Browser application 112 may correspond to one or more processes to execute software modules and associated components of client device 110 to provide features, services, and other operations for a user, administrator, developer, or other operator associated with service provider server 120 over an internal network or intranet for network 140. In this regard, browser application 112 may correspond to specialized software utilized by a user of client device 110 that may be used to access a website or UI provided by service provider server 120 to perform actions or operations. For example, browser application 112 may be associated with a domain may correspond to a business unit, task, division, or department of an organization corresponding to service provider server 120, such as domains of an online transaction processor. Browser application 112 may be associated with account information, user financial information, and/or transaction histories. However, in further embodiments, different services may be provided via browser application 112, including messaging, social networking, media posting or sharing, microblogging, data browsing and searching, online shopping, and other services available through service provider server 120. Thus, browser application may also correspond to different service applications and the like.

However, when using browser application 112, a directory enumeration process 114 may be executed that attempts to enumerate the file paths within a directory, such as by scanning, navigating to, or otherwise checking file paths in an order, randomly, or through other input means. This may occur where client device 110 is compromised, such as by having malware or computer viruses and malicious operations. Client device 110 may also be used by a malicious party to perform directory enumeration process 114. Directory enumeration process 114 therefore attempts to determine hidden, secret, or other unknown or unregistered pages and files within an internal directory so that secret data may be found, and/or secret operations may be used maliciously or fraudulently. As client device 110 may share an IP address or other network address on network 140 with other devices, service provider server 120 may therefore execute a process to confuse, obfuscate, or render unhelpful the results of directory enumeration process 114.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with browser application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 116 may include directory enumeration results and detected file path status or data, including results from honeypot pages of honeypot file paths, page information, byte size, or page status. Database 116 may also store identifying data, such as device identifiers, network addresses, login credentials, usernames, and the like that may be provided to a data logging process on a honeypot page to identify client device 110 as the source of directory enumeration process 114.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide operations for detection of directory enumeration attempts on network 140 or another network, including an external network. In this regard, service provider server 120 includes one or more processing applications which may be configured to interact with client device 110 to detect whether client device 110 is performing a directory enumeration and/or deploy honeypot pages to deter, deflect, resolve, and/or prevent the directory enumeration. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a honeypot application 130, other applications 122, a database 124, and a network interface component 128. Honeypot application 130 and other applications 122 may correspond to executable processes, procedures, and/or applications with associated hardware. In other embodiments, service provider server 120 may include additional or different modules having specialized hardware and/or software as required.

Honeypot application 130 may correspond to one or more processes to execute modules and associated specialized hardware of service provider server 120 to provide a platform and framework to detect and protect against directory enumeration attempts of digital directories for file paths of an organization, such as a business, service provider, or other entity that utilizes database systems. In this regard, honeypot application 130 may correspond to specialized hardware and/or software used by service provider server 120 to first detect a directory enumeration attempt or attack, such as one executed by directory enumeration process 114 performed by client device 110. A directory enumeration attempt may be detected by a directory enumeration detector 132 of honeypot application 130 when page hits (e.g., attempts to scan, access, discover some information, or navigate to) exceeds a particular threshold within a directory and/or at a particular file path or set of file paths. This threshold may be detected over a time period, such as an amount of page hits exceeding a threshold in a minute or hour. Additionally, directory enumeration detector 132 may also detect the directory enumeration attempt when a number of returned page error status codes or other invalid page status codes returned within the same or different time period meets exceeds a threshold for invalid status code returns. Directory enumeration detector 132 may continuously or periodically check for these scans of a directory, including whether certain pages are scanned (e.g., honeypot pages that are normally inaccessible or unknown to internal users.

If directory enumeration detector 132 detects a directory enumeration attempt, a honeypot deployment 134 may be performed by honeypot application 130 to deploy different honeypot pages and/or files, as well as change file path data at different files paths, in order to prevent or defend against the directory enumeration attempt. In some embodiments, the deployment of honeypot pages may be performed in response to and reactively to the detection of the directory enumeration and may also be scaled by the aggressiveness or speed of the enumeration attempt. Further, honeypot deployment 134 may also occur predictively or prior to detecting a directory enumeration so that honeypot pages may be used to detect the directory enumeration and/or provide honeypot pages when the directory enumeration starts and/or is not detected.

Honeypot deployment 134 may deploy a few different types of honeypot pages. One type may include changing a file path to a nonexistent page or file from returning an error status to returning one of a valid page status code or a page redirect status code. When returning a valid status or page redirect status, honeypot deployment 134 may further provide a changed or randomized page of file byte size at the file path, as well as selected messages, text, or randomized page information. Honeypot deployment 134 may also deploy a logger or other logging operation that may be used to request and/or detect an IP address, device identifier or information, login screen for a username or authentication credentials, or other operations to obtain more information for a true source of the directory enumeration. Honeypot pages at file pages may be deployed by honeypot deployment 134 as a static individual page within a web server layer for the directory of the file paths in the internal network, such as by deploying at a high level within a web server template. Honeypot deployment 134 may also use a rewrite rule in or application level configuration for deployment. In some embodiments, honeypot deployment 134 may randomize or change statuses in a code level, or a proxy level where honeypot deployment 134 receives the changed status code, transforms the status code, and forwards the status code when receiving a scan or navigation to the honeypot page file path.

Other applications 122 may correspond to one or more processes to execute modules and associated specialized hardware of service provider server 120 to perform a service to internal or external end users of service provider server 120, such as process a transaction between users or entities. In this regard, other applications 122 may correspond to specialized hardware and/or software used by a user associated with client device 110 to perform one or more services on an internal and/or external network, including electronic transaction processing through one or more user accounts. Other applications 122 may also correspond to messaging, social networking, media posting or sharing, microblogging, data browsing and searching, online shopping, and other services available through service provider server 120. Other applications 122 may provide sensitive or secret data at one or more pages or file paths within a directory of accessible through network 140, which may be detected and compromised through a directory enumeration attempt by client device 110

Additionally, service provider server 120 includes a database 124. Database 124 may store various identifiers associated with client device 110. Database 124 may also store account data, including payment instruments and authentication credentials, as well as transaction processing histories and data for processed transactions. Database 124 may store financial information or other data generated and stored by other applications 122. This may include data from one or more operations provided by other applications 122, including directories, file paths, and file path pages or files within the directory. Database 124 may also store honeypot pages and honeypot page data, status codes, and/or logging operations, as well as any information resulting from deploying honeypot pages and/or capturing data using the logging operation of a true source of a directory enumeration attempt by client device 110 or another device.

In various embodiments, service provider server 120 includes at least one network interface component 128 adapted to communicate client device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
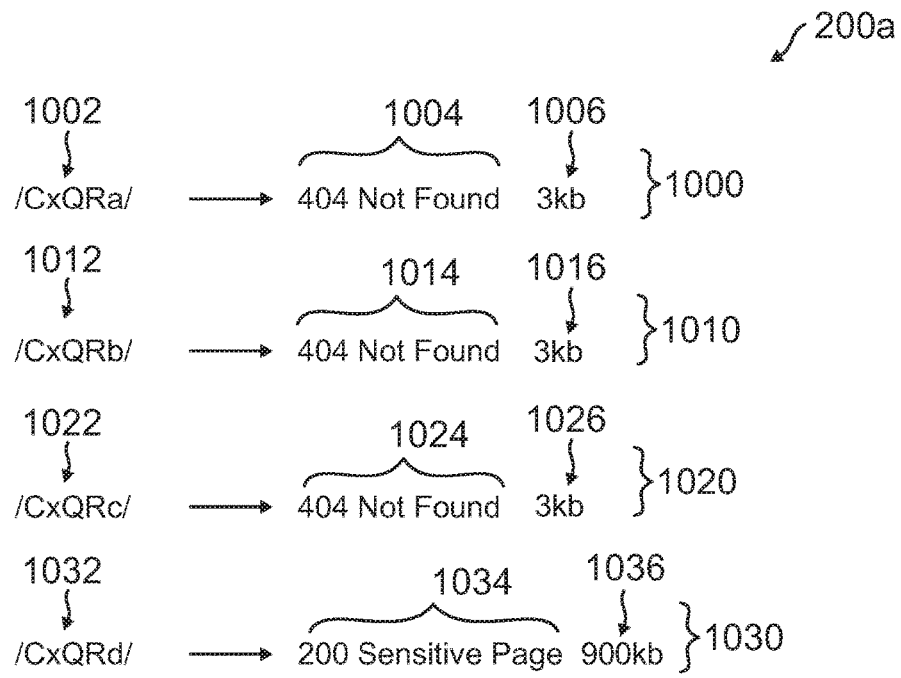
FIG. 2A is an exemplary diagram of a set of file paths that may be enumerated on by a directory enumeration attempt, according to an embodiment.

FIG. 2A is an exemplary diagram 200a of a set of file paths that may be enumerated on by a directory enumeration attempt, according to an embodiment. Diagram 200a of FIG. 2A includes file paths, statuses, and corresponding pages or files at valid file paths, which may be found within a directory of service provider server 120 in system 100 of FIG. 1. Thus, the directory and the corresponding statuses of the file paths in diagram 200a may be detected through a directory enumeration performed by a device, such as client device 110 from system 100.

In this regard, a directory may include pages or files that are available at different file paths, such as a page 1000, a page 1010, a page 1020, and a page 1030. The directory includes a file path 1002, a file path 1012, a file path 1022, and a file path 1032 may be located within the directory and may correspond to valid pages or files, redirect pages or files, and nonexistent or invalid pages or files for pages 1000, 1010, 1020, and 1030, respectively. When performing a directory enumeration, client device 110 may execute a directory enumeration process, attempt, or attack to determine which of file paths 1002, 1012, 1022, and/or 1032 have corresponding valid pages or files, which may correspond to secret, sensitive, or confidential information or operations, such as data for login or authentication credentials and passwords. Each of file paths 1002, 1012, 1022, and 1032 may return a particular status code when scanned or enumerated over, such as when hit using a directory enumeration process and/or navigated to by a malicious device and operation.

For example, file path 1002 for page 1000 includes a status code 1004 having a byte size 1006, file path 1012 for page 1010 includes a status code 1014, file path 1022 for page 1020 includes a status code 1004 having a byte size 1026, and file path 1032 for page 1030 includes a status code 1034 having a byte size 1036. As shown for file paths 1002, 1012, and 1022, corresponding status codes 1004, 1014, and 1024 each show as invalid or error page status codes, such as a "404 Not Found" status code of a nonexistent or invalid page. Further, for file paths 1002, 1012, and 1022, corresponding byte sizes 1006, 1016, and 1026 show as a minimum or preset byte size, such as 3 KB, which would normally be found and returned for a nonexistent or invalid page. However, in contrast, file path 1032 returns a valid page status code for status code 1034, such as "200" or "200 Valid" for a sensitive page for page 1030. Further, page 1030 may provide a returned byte size for page 1030 of 900 KB, meaning byte size 1036 includes some data at page 1030.

Without honeypot pages, file path 1032 that leads to sensitive page 1034 and returns a valid page status code may be detected during the directory enumeration and the malicious party may navigate to file path 1032 to retrieve data from page 1030 when status code 1034 shows as a valid page and status code, such as data corresponding to a byte size 1036 for page 1030. Thus, an operation to protect from directory enumeration may change pages 1000, 1010, and 1020, as well as file paths 1002, 1012, and 1022, status codes 1004, 1014, 1024, and byte sizes 1006, 1016, and 1026, using honeypot pages. These honeypot pages may then be used to obfuscate or render unhelpful the results of the directory enumeration, as well as find out information about a true source of the directory enumeration.

Figure 2B:
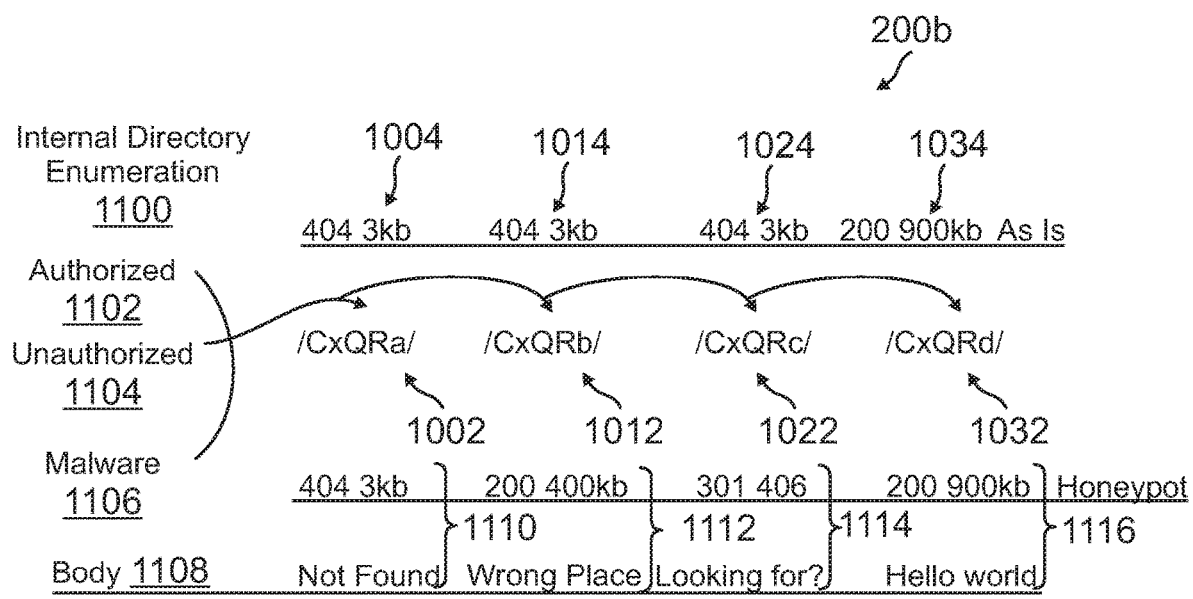
FIG. 2B is an exemplary diagram of honeypot page deployments to protect against directory enumeration, according to an embodiment.

FIG. 2B is an exemplary diagram 200b of honeypot page deployments to protect against directory enumeration, according to an embodiment. Diagram 200b of FIG. 2B includes file paths, statuses, and corresponding pages or files at valid file paths, which may be found within a directory of service provider server 120 in system 100 of FIG. 1. Thus, the directory and the corresponding statuses of the file paths in diagram 200b may be detected through a directory enumeration performed by a device, such as client device 110 from system 100. However, in contrast to diagram 200a, in diagram 200b, honeypot pages have been deployed to previously invalid or nonexistent pages and/or file paths to protect and/or defend against the directory enumeration.

In diagram 200b, file paths 1002, 1012, and 1022, and their corresponding pages, have been adjusted by a honeypot deployment operation to defend against directory enumeration and assist in protecting file path 1032 from being enumerated and accessed in an unauthorized manner and/or detecting the true source of the directory enumeration. In various embodiments, scanning or navigation to file paths 1002, 1012, 1024, and/or 1034 may be performed by different sources. For example, an authorized access 1102 may be performed by a legitimate end user, such as a developer or tester of the different file paths. However, an internal directory enumeration 1100 may also be performed by unauthorized access 1104, such as if a malicious user is executing internal directory enumeration 1100. Further, malware 1106 may also cause internal directory enumeration 1100 to be performed, such as if a device is compromised. Thus, the service provider may wish to protect from discovery of file path 1032 as having page data 1116 for secret page data when enumerated and status code 1034 returns a valid status for file path 1032 and page data 1116.

In this regard, after internal directory enumeration 1100 is detected, such as if page hits and/or returned error status codes exceed a threshold for a domain, IP address, or directory (e.g., a scan is detected), a service provider system and/or server may execute a honeypot page deployment operation. In some embodiments, honeypot deployment may also occur prior to detecting of internal directory enumeration 1100. For example, file path 1002 may previously correspond to a nonexistent or invalid page or file. In diagram 200b, file path 1002 may be unaltered so that no honeypot page is provided at file path 1002 and therefore byte size 1004 provides the previous byte size for the nonexistent page. Moreover, file path 1002 returns page data 1110 for an error status and no page for a body 1108 of the corresponding page. File path 1002 may remain unaltered so that not all pages are converted to honeypot pages and the honeypot deployment may be hidden from the malicious actor. Further, when scaling deployment of honeypot pages based on attack or scan frequency, file path 1002 may remain available for further use in honeypot page deployment.

However, when deploying honeypot pages, file paths 1012 and 1022 may be altered to provide a result for a page status code as a different result (e.g., no longer an error status) from the previous status, such as a valid status or a redirect status. For example, at file path 1012, status code 1014 previously returned an error or invalid status. However, page data 1112 has been updated to return a 200 Valid or OK status for a valid page in contrast to the previous invalid or error status. Further, file path 1012 also returns a byte size of 400 KB to make the appearance of valid data in body 1108 of the page for file path 1012. This would then confuse or obfuscate the results of a directory enumeration by making file path 1012 appear as valid even though the page may be invalid, nonexistent, or a generic honeypot page with no secret data. Further, body 1108 may include a message, such as wrong place, or may have a logging mechanism or operation to attempt to find out more data of the source of internal directory enumeration 1100. This logging mechanism may request an IP address or device identifier from the device that navigates to file path 1012 or may have a login page for a user to enter credentials.

Similarly, file path 1022 is altered to have a page redirect status code for page data 1114. Page data 1114 further includes 40 KB to further cause file path 1022 to appear to direct to an existing page within the directory being enumerated. Page data 1114 may therefore provide further confusing results for internal directory enumeration 1100. Where body 1108 for page data 1114 includes a redirect status, file path 1022 may not be required to include a logging mechanism. However, in some embodiments, page data 1114 my redirect to another page having the logging mechanism or may also include the logging mechanism. Thus, in some embodiments to further confuse or render useless the results of internal directory enumeration, the byte size and/or status codes for page data 1112 and 1114 may further be randomized, changed or altered, including using 3 KB for a valid page or redirect page (e.g., appearing as invalid but having no data) or by placing a large byte size for an error or invalid page.

Figure 3:
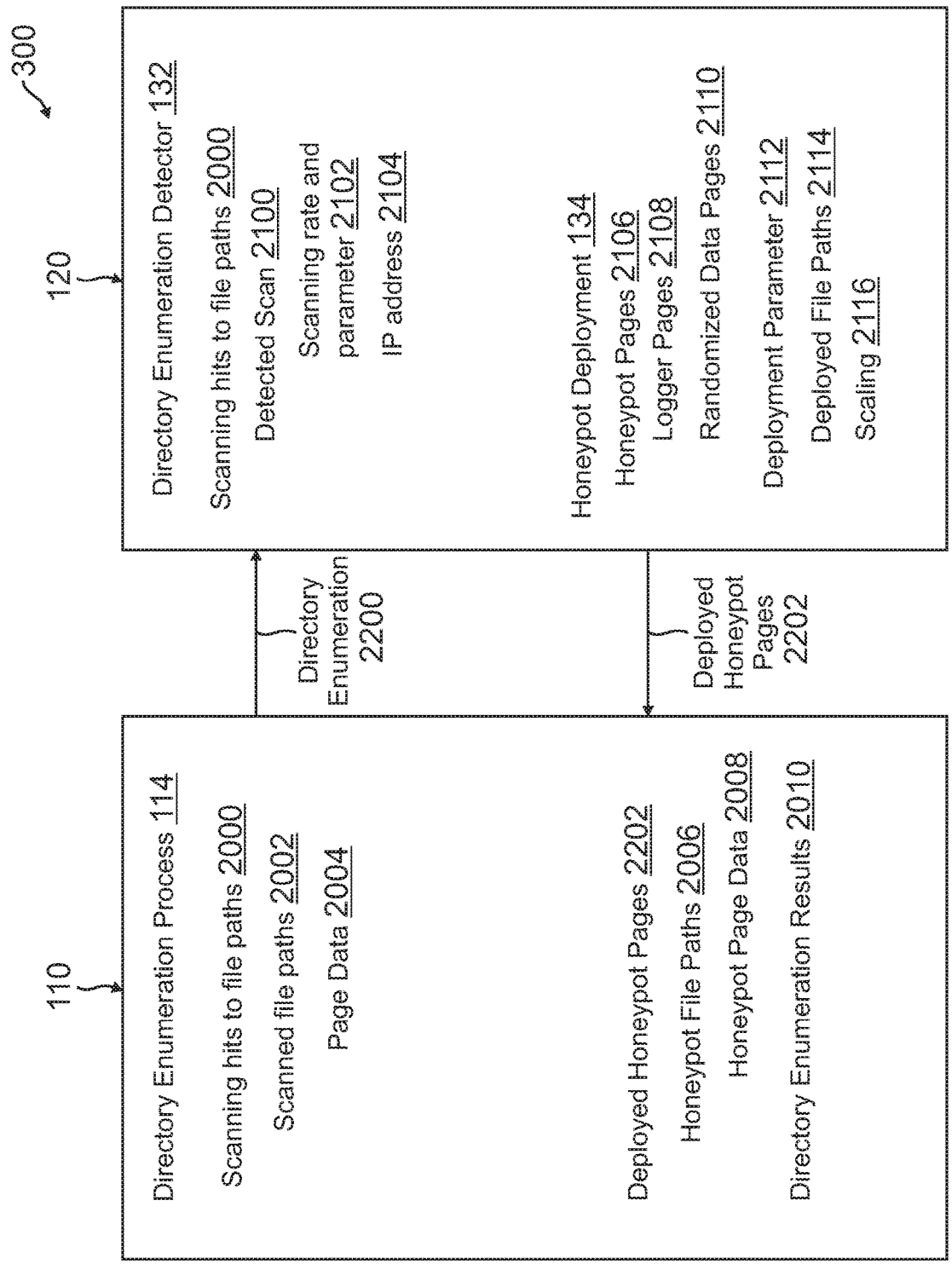
FIG. 3 is an exemplary environment where a service provider server may deploy honeypot pages to protect from an internal malicious device, according to an embodiment.

FIG. 3 is an exemplary environment 300 where a service provider server may deploy honeypot pages to protect from an internal malicious device, according to an embodiment. Environment 300 includes client device 110 and service provider server 120 discussed in reference to system 100 of FIG. 1. In this regard, client device 110 executes directory enumeration process 1114 and service provider server 120 executes directory enumeration detector 132, as discussed in reference to system 100.

In environment 300, directory enumeration process 114 is initiated to begin a directory enumeration attempt. For example, directory enumeration process 114 may designate a directory to enumerate by testing through different files paths (e.g., by sequential testing letter, number, symbol, or other characters that potentially may lead to a valid page using a file path). This may correspond to testing a directory through scanning /aaa/ then /aab/ and so on through different combinations. When performing a directory enumeration 2200, directory enumeration process 114 may then determine scanning hits to file paths 2000, such as scanned file paths 2002 that may include valid file paths, redirect file paths, and/or invalid file paths, as well as page data 2004 that may be detected (e.g., page byte size, page body, and/or other page status codes or information).

Thus, directory enumeration 2200 may be performed with service provider server 120. Directory enumeration detector 132 may then detect scanning hits to file paths 2000, which may include a number and/or rate of scanning or hits to file paths, as well as a number and/or rate of returned error codes. Based on the number or rates of hits and/or error status codes, directory enumeration detector 132 may determine a detected scan 2100, for example, based on a scanning rate and parameters 2012 (e.g., hits and error code status returns). Furthermore, detected scan 2100 may include an IP address 2104 for client device 110 when the scan is detected. However, as IP address 2104 may be shared between multiple devices within an internal network such that IP address 2104 may not specifically identify a particular user or device. As such, service provider server 120 may require honeypot deployment 134 to protect from directory enumeration 2200.

Thereafter, service provider server 120 executes honeypot deployment 134 so that honeypot pages 2106 may be deployed and enumerated on during directory enumeration 2200, as well as navigated after directory enumeration 2200 where a malicious actor attempts to access secret pages and data. For honeypot pages 2106, different pages and/or data may be deployed at file paths that were previous invalid or corresponded to nonexistent pages, files, or data. Honeypot pages 2106 may also be deployed based on the directory structure, such as at specific locations or file paths that may encourage a malicious user to navigate to honeypot pages 2106. For example, logger pages 2108 may be used to determine additional data about client device 110 and/or the bad actor using client device 110. When deploying logger pages 2108, honeypot deployment 134 may select files paths that appear legitimate, such as a file path that includes a name, word, or string of characters that may be used for a secret page. Similarly, files paths that may be deeply buried may also be utilized to appear as though logger pages 2108 are attempting to hide within the directory, and therefore may be legitimate secret pages.

Further, randomized data pages 2110 may also be deployed by randomizing or changing the page status codes and/or page sizes (e.g., page data byte size). Randomized data pages 2110 may be deployed in circumstances to confuse directory enumeration 2200, such as when secret pages within a directory may need to remain hidden. For example, randomized data pages 2110 may be deployed in a directory that has many hidden pages, thereby decreasing a likelihood that a secret page is found and navigated to by a malicious party after directory enumeration 2200. Deployment parameters 2112 may determine how many of honeypot pages 2106 are deployed, including if honeypot pages 2106 may be deployed prior to directory enumeration 2200 or maintained for a time period after directory enumeration 2200. Further, deployment parameters 2112 may include the conditions or circumstances regarding deployment of honeypot pages 2106, such as when and where in a directory each of logger pages 2108 and randomized data pages 2110 may be deployed.

Deployment parameters 2112 includes deployed file paths 2114 from previously unused file paths, as well as scaling 2116 that may determine how many of honeypot pages 2106 are deployed, if deployment is scaled up due to increased attacks and activity, or if deployment is scaled back or ended when directory enumeration 2200 ends or is no longer detect. For example, scaling 2116 may increase deployment of honeypot pages 2106 when multiple directory enumeration scans are detected or if a rate of directory enumeration 2200 is over a threshold and/or increases in frequency. Conversely, when directory enumeration 2200 is no longer detected or a rate of hits and/or error status codes is below a threshold, scaling 2116 may reduce or eliminate deployment of honeypot pages 2106. Further, scaling 2116 may determine the number or rate of deployment of logger pages 2108 and/or randomized data pages 2110. In this regard, scaling 2116 may increase deployment of logger pages 2108 when identifying a true source of directory enumeration 2200 is important, such as when ending directory enumeration 2200 is critical. Similarly, scaling 2116 may increase deployment of randomized data pages 2110 to protect hidden pages and/or further confuse the results of directory enumeration 2200. Thereafter, service provider server 120 provides deployed honeypot pages 2202 back to client device 110. Deployed honeypot pages 2202 include honeypot file paths 2006, which may be enumerated and appear valid for directory enumeration 2200. Further, honeypot file paths 2006 may navigate to honeypot page data, such as page size and/or status code. This is then used with scanned file paths 2002 to generate directory enumeration results that includes deployed honeypot pages 2202. Since deployed honeypot pages 2202 at honeypot file paths 2006 appear valid, directory enumeration results may be unhelpful and/or cause a malicious actor to navigate to logging mechanism to discovery their identity.

Figure 4:
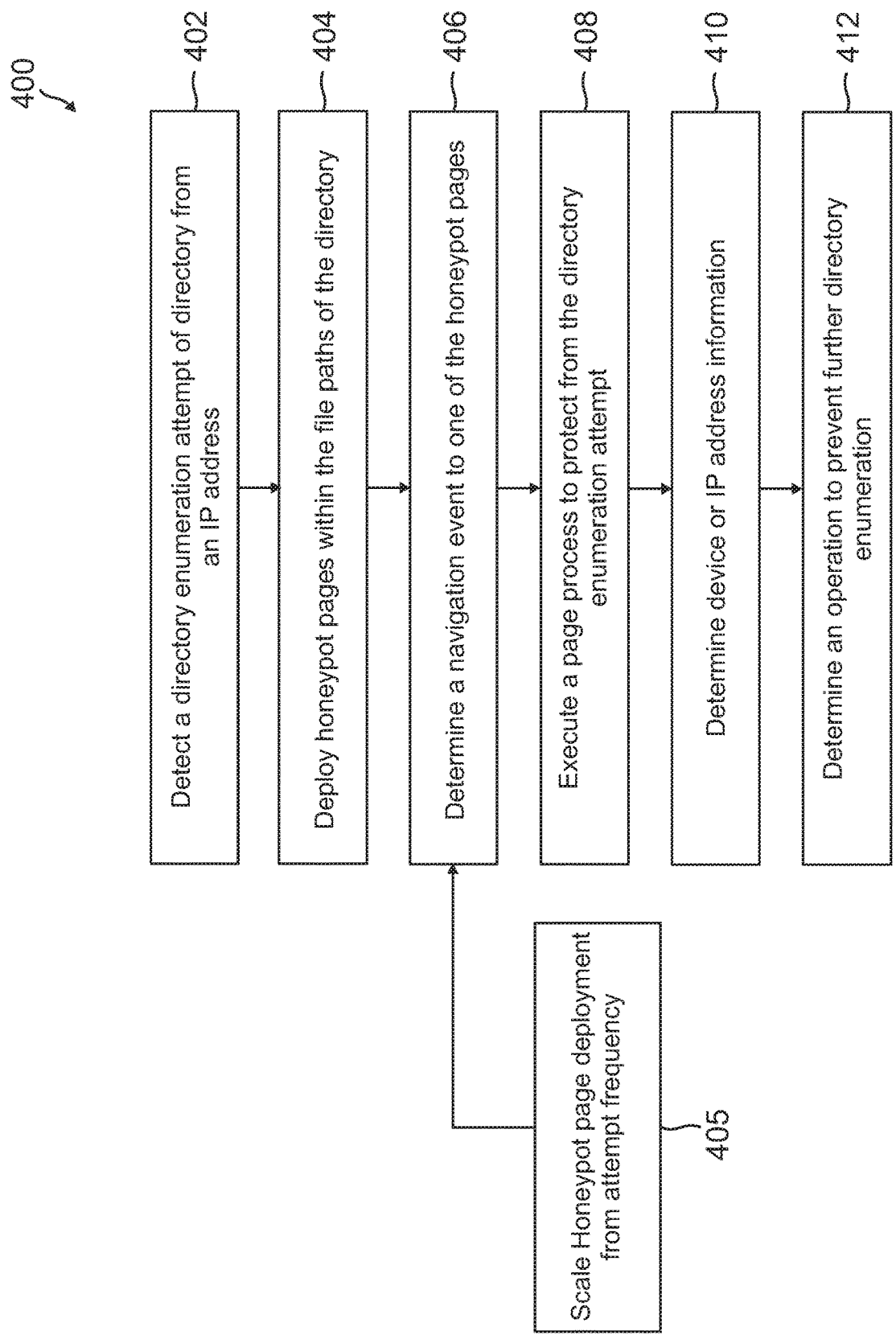
FIG. 4 is a flowchart for protecting from directory enumeration using honeypot pages within a network directory, according to an embodiment.

FIG. 4 is a flowchart 400 for protecting from directory enumeration using honeypot pages within a network directory, according to an embodiment. Note that one or more steps, processes, and methods described herein of flowchart 400 may be omitted, performed in a different sequence, or combined as desired or appropriate.

At step 402 of flowchart 400, a directory enumeration attempt of a directory is detected from an IP address. The directory enumeration attempt may occur from an internal source or device such that determination of the IP address may not assist the service provider in identifying the source of the directory enumeration. Moreover, the directory enumeration may be detected through detecting a scan of one or more pages, such as when a device hits a previous honeypot page or hidden page, when a number or rate of hits is at or over a threshold, and/or when a number of returned error codes is at or over a threshold. In response to detecting the directory enumeration attempt, the service provider then deploys honeypot pages within the file paths of the directory. The service provider may randomly select file paths to deploy honeypot pages or may deploy honeypot pages at file paths not yet enumerated (e.g., buried within the directory). This may be done by rewriting page source code and/or using a proxy to provide a different result for a file path.

Moreover, different types of honeypot pages may be deployed. To confuse the directory enumeration, and provide bad results to that enumeration, honeypot pages may correspond to randomized or altered page status codes (e.g., 200 OK/Valid or 301 Redirect in place of 404 Error), as well as randomized or altered page byte sizes. This may be done through a hierarchy of the directory and at a web server layer. Thereafter, a navigation event to one of the honeypot pages is detected at step 406. The navigation event may occur as a result of the enumeration and scan of the corresponding file path. Additionally, the navigation may occur after the directory enumeration, such as when a bad actor or malicious device/operation attempts to navigate to a honeypot page that has been enumerated and appears valid. In some embodiments, prior to detecting the navigation, the honeypot page deployment may be scaled in deployment amount (e.g., number of deployed honeypot pages) based on an attempt frequency, at step 405. This may occur when directory enumeration occurs faster or at a higher rate from the malicious device or other malicious devices.

At step 408, a page process to protect from the directory enumeration is executed, which may correspond to the type and operations of the honeypot page. For example, the honeypot page may include a proxy process or page code that returns a different page status code and/or page byte size for the honeypot page to obfuscate the results of the directory enumeration. In further embodiments, the page process may include a logging mechanism that may be used to determine information about a network address, device identifier, and/or user identifier, from the device and/or user navigating to the honeypot page. This may allow for determination of a true source of the directory enumeration.

At step 410, device information or IP address information is determined, which may also include a user identifier where a login process may be provided to log a user identifier on the honeypot page. The logging mechanism may therefore determine information on the device or user as the true source of the directory enumeration. Using this information, an operation to prevent further directory enumeration is determined, at step 412. The operation may be determined to identify the device performing the directory enumeration, as well as prevent further enumeration. For example, the operation may isolate or quarantine the device performing the directory enumeration and/or the IP address corresponding to the device. Further, the operation may rate limit page hits from the device and/or within the enumerated directory to slow or stop the directory enumeration.

Figure 5:
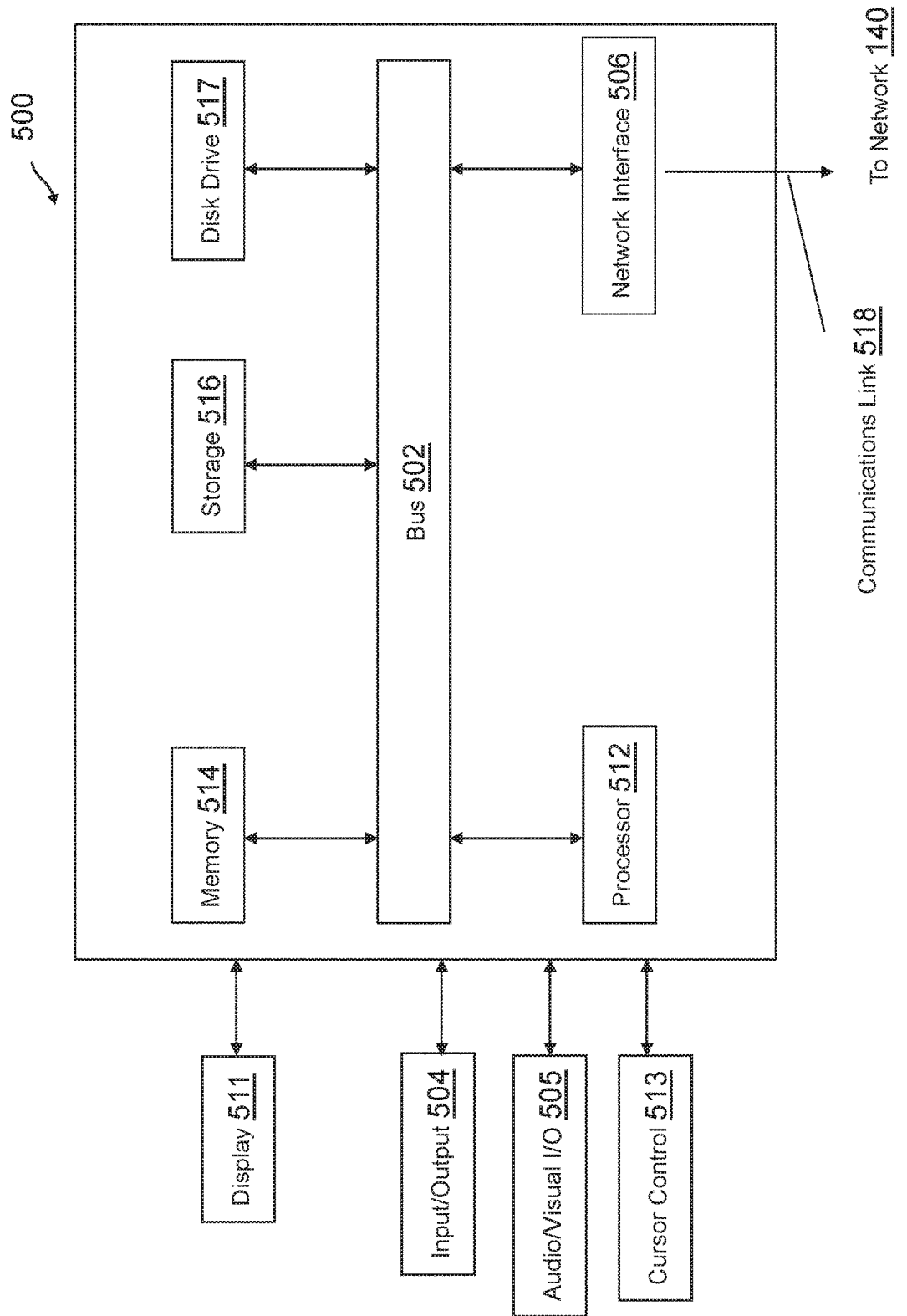
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      detecting a plurality of page access requests from a computing device within an internal network associated with the system;
      analyzing the plurality of page access requests, by the computing device, of a directory of file paths within the internal network;
      determining, from the analyzing, that the plurality of page access requests comprise a sequential scan by the computing device when performing the plurality of page access requests;
      determining, based on the sequential scan, that the computing device is performing a directory enumeration attempt by the computing device within the internal network associated with the system, wherein the directory enumeration attempt is associated with accessing the directory of files paths for the internal network;
      deploying a first page at a first file path from the directory of file paths within the internal network, wherein the first file path previously returned an invalid page status code, and wherein the first page comprises one of a valid page status code or a redirect page status code at the first file path;
      detecting a scan of the first page by the computing device during the directory enumeration attempt using the first file path; and
      returning the one of the valid page status code or the redirect page status code to the computing device based on the detecting the scan.

2. The system of claim 1, wherein the first page further comprises a data logging operation when the first page returns the valid page status code, and wherein the data logging operation comprises at least one of an IP address logger, device identifier logger, or a login interface for a user identifier.

3. The system of claim 2, wherein the operations further comprise:
   detecting a navigation to the first page; and
   logging information comprising at least one of an IP address, a device identifier, or the user identifier using the data logging operation.

4. The system of claim 3, wherein the operations further comprise:
   maintaining the first page at the first file path for a time period;
   detecting an additional navigation to the first page during the time period;
   logging additional information from the additional navigation using the data logging operation; and
   outputting a log history based on the logging the information and the additional information.

5. The system of claim 1, wherein the first page further comprises a modified byte size when the first page returns the one of the valid page status code or the redirect page status code.

6. The system of claim 5, wherein the first page further comprises a modified page body having a page message when the first page returns the one of the valid page status code or the redirect page status code.

7. The system of claim 5, wherein the modified byte size comprises one of a randomized byte size or a set byte size in place of a byte size for an unavailable page within the directory.

8. The system of claim 1, wherein the first page is deployed as a static individual page within a web server layer for the directory of the file paths in the internal network.

9. The system of claim 8, wherein prior to the deploying the first page, the operations further comprise:
   executing a directory enumeration security application to protect against the directory enumeration by the computing device, wherein the directory enumeration security application comprises an operation to rewrite the file paths on the web server layer,
   wherein the deploying the first page is performed by the directory enumeration security application using the operation to rewrite the file paths.

10. The system of claim 1, wherein the first page is deployed by writing the first page to a static file at the first file path and deployed using a template for the system.

11. The system of claim 1, wherein the operations further comprise:
    deploying a second page having a second file path within the internal network, wherein the second file path previously returned the invalid page status code, and wherein the second page comprises one of a valid page status code or a redirect page status code at the first file path.

12. The system of claim 1, wherein the directory enumeration attempt is detected from an IP address used by the computing device and associated with the internal network, and wherein the IP address is shared by multiple devices on the internal network.

13. The system of claim 1, wherein the detecting the directory enumeration attempt comprises at least one of detecting a number of scan attempts of file paths within the directory meets or exceeds a first threshold over a time period or detecting a number of returned page error codes meets or exceeds a second threshold within the time period.

14. A method comprising:
    detecting page access requests by an internal IP address of file paths to internal pages of a networked system;

analyzing the page access requests, by the internal IP address, of a directory comprising the file paths;

determining, from the analyzing, that the page access requests comprise a sequential scanning by the internal IP address when performing the page access requests;

determining, based on the sequential scanning, that a scan is being performed by the internal IP address of the directory comprising the file paths to the internal pages of the networked system, wherein the scan includes a directory enumeration attempt;

determining a navigation to a first internal page of the internal pages as part of the directory enumeration attempt using a first file path of the file paths, wherein the first internal page was deployed at the first file path after an invalid status for page access request was returned, such that the first internal page provides a modified status for the first internal page, and wherein the first internal page comprises a modified page byte size of the first internal page or a source logging process of the first internal page; and in response to the determining the navigation, providing the first internal page in place of the previous invalid status for the first file path.

15. The method of claim 14, wherein prior to determining the scan, the method further comprises:

providing the first internal page with a subset of internal pages at a subset of the file paths, wherein the subset of internal pages provides the modified status and comprise the one of the modified status for the modified page byte size or the invalid status for the one of the source logging process or the modified page byte size.

16. The method of claim 14, wherein the determining the scan comprises detecting an increase in network traffic within the networked system over a threshold, and wherein the providing the first internal page comprises deploying a plurality of internal pages including the first internal page and comprising the process.

17. The method of claim 16, wherein the deploying the plurality of internal pages is scaled based on an amount of the increase in the network traffic.

18. The method of claim 14, wherein prior to the determining the navigation, the method further comprises:

providing the first internal page with a subset of internal pages at a subset of the file paths, wherein the subset of internal pages provides the modified status and comprise the one of the modified status for the modified page byte size or the invalid status for the one of the source logging process or the modified page byte size.

19. The method of claim 14, wherein the modified status comprises one of a redirect status or a valid status.

20. A non-transitory machine-readable medium having stored thereon machine-readable instructions executable to cause a machine to perform operations comprising:

detecting a plurality of page access requests from a computing device over a network with a service provider;

analyzing the plurality of page access requests, by the computing device, of a directory over the network;

determining, from the analyzing, that the plurality of page access requests comprise a sequential scan by the computing device when performing the plurality of page access requests;

determining, based on the sequential scan, that the computing device is performing a directory enumeration attack associated with a plurality of honeypot pages in the directory by the computing device over the network with the service provider, wherein the directory enumeration attack attempts to enumerate active pages within the directory of the network, and wherein the plurality of honeypot pages each comprise one of a randomized page response to a scan of the honeypot page or a valid page response having a logging mechanism for at least one of a network address, a device identifier, or a user identifier;

detecting that the directory enumeration attack further attempts a navigation to one of the plurality of honeypot pages by the computing device; and providing the one of the plurality of honeypot pages to the computing device.

* * * * *